I. A. Heald,
Sawing Stone.
N° 14,536. Patented Mar. 25, 1856.
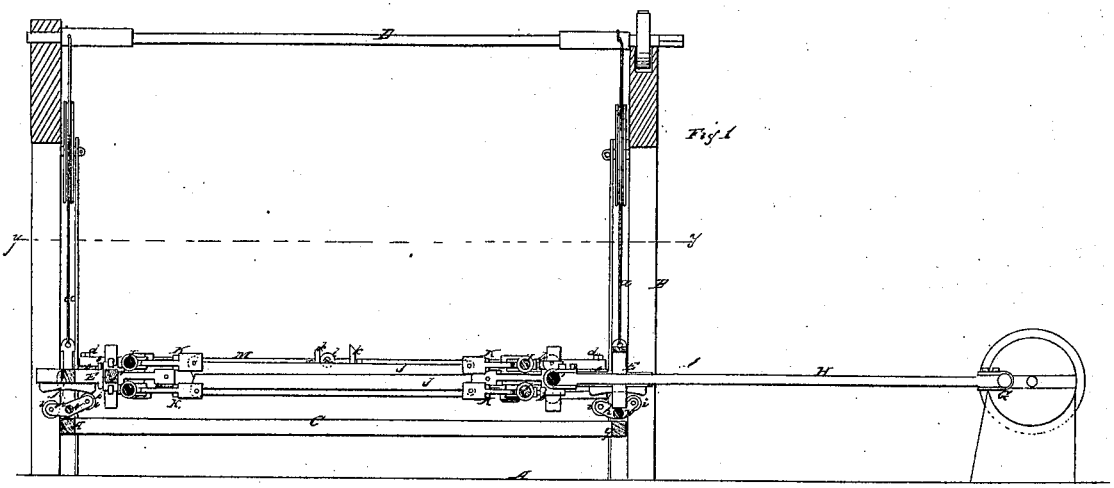
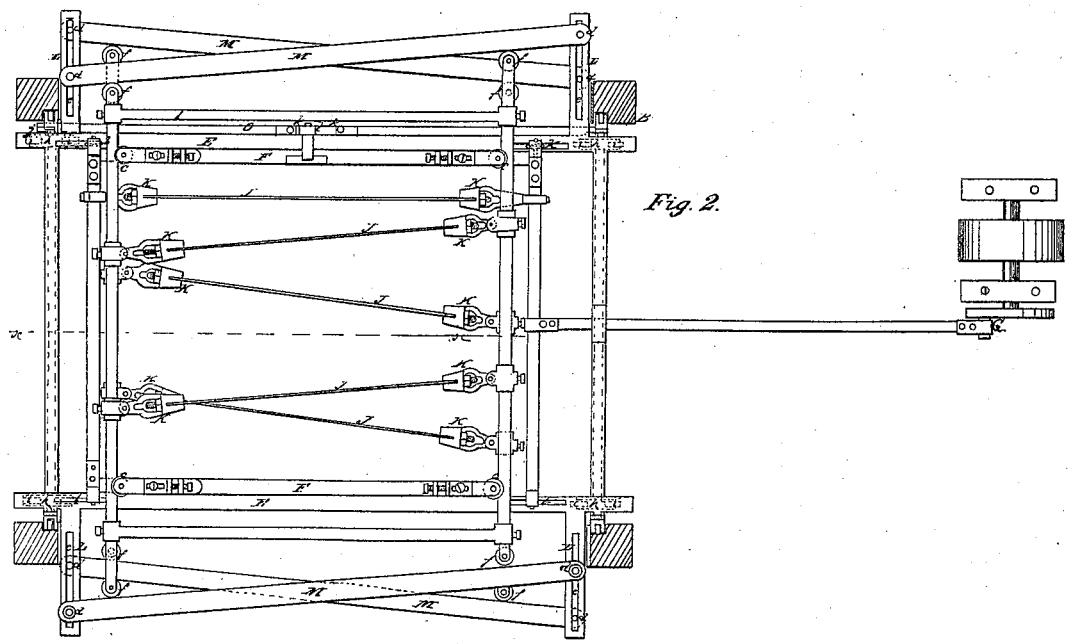

UNITED STATES PATENT OFFICE.

ISSACHAR A. HEALD, OF SPRINGFIELD, MASSACHUSETTS.

MACHINE FOR SAWING MARBLE IN OBELISK FORM.

Specification of Letters Patent No. 14,536, dated March 25, 1856.

*To all whom it may concern:*

Be it known that I, ISSACHAR A. HEALD, of Springfield, in the county of Hampden and State of Massachusetts, have invented a new and Improved Machine for Sawing Marble Blocks in Polygonal Taper Form; and I do hereby declare that the following is a full, clear, and exact description of the same, reference being had to the annexed drawings, making a part of this specification, in which—

Figure 1, is a longitudinal vertical section of my improvement, (*x*), (*x*), Fig. 2, showing the plane of section. Fig. 2, is a horizontal section of the same, (*y*), (*y*), Fig. 1, showing the plane of section.

Similar letters of reference indicate corresponding parts in the two figures.

The invention consists in having the saw frames elevated at the end of each stroke or at the termination of their forward and backward movement so that sand, which is always employed in sawing stone, may pass into the saw kerfs underneath the saws.

To enable those skilled in the art to fully understand and construct my invention, I will proceed to describe it.

A, represents a platform or flooring on which a framing, B, is placed; and C, represents a horizontal frame which is fitted within the framing, B, and is suspended by ropes or chains, (*a*), to a shaft, D, on the upper part of the framing, B; the frame, C, being allowed to slide freely up and down within the framing, B.

E, is a frame which is placed upon the frame, C, and on which a reciprocating frame, F, works; the frame F, having friction rollers, (*b*), attached to it, which friction rollers bear a work against the upper and lower surfaces of the side pieces of the frame, E. The frame, F, is operated or has a reciprocating motion given it, by means of a crank, G, and pitman, H. To the upper and lower sides of the reciprocating frame, F, there are attached saw frames, I, I, which bear against friction rollers, (*c*), (*c*), on the upper and lower sides of the frame, F, see Fig. 2. J, represents saws which are secured in the frames, I; any proper or desired number of saws being used. These saws are strained between heads, K, on the front and back rails of the saw frames, I; said heads being adjustable, or so arranged that they may be shifted or moved upon the rails, and secured at any desired point. To each side of the frame, E, there are attached arms, L, to which guide bars, M, are secured by screw bolts, (*d*); said bolts passing through slots, (*e*), in the arms, so that the guide bars may be set obliquely or angularly with the sides of the reciprocating frame, F. The ends of the front and back rails of the saw frames are provided with friction rollers, (*f*), which bear against the inner sides of the guide bars, M, as shown clearly in Fig. 2.

Directly over the front and back rails, (*g*), of the frame, C, there are placed rock shafts, N, one over each rail, and to the ends of the rock shaft there are attached arms, (*h*), which have a friction roller, (*i*), at each end, as shown clearly in Fig. 1. The rock shafts have a lever or crank pin, (*j*) at one end, and a bar, O, is attached to the upper ends of the levers or crank pins. The bar, O, has two small vertical pins, (*k*), (*k*), attached to it at about its center, and a friction roller, (*l*), on a pin, (*m*), which is attached to the reciprocating frame, F, works between the two pins, (*k*), (*k*).

The operation is as follows: The frame, C, and saw frames, I, are elevated by turning the shaft, D, and the saws, J, in the saw frame, by adjusting the heads, K, are set obliquely or angularly with the sides of the saw frames and corresponding with the taper intended to be given the sides of the marble block. The guide bars, M, are also set so as to be parallel with the saws, J. The saws in one frame cut the sides of the block opposite to the sides cut by the saws of the other frame, consequently the saws of the two frames are set in opposite directions, as clearly shown in Fig. 2. When the saws and guide bars are set, the marble block is placed underneath the saws and a reciprocating motion is given the frame, F, by means of the crank, G, and pitman, H, the saws being lowered so as to rest upon the marble block. The saw frames, I, I, work with the frame, F, and the guide bars, M, give a lateral vibrating movement to the saws while they are working longitudinally so that the saws will cut angularly or obliquely. At each end of the stroke of the saws, the roller, (*l*) will strike against one of the pins, (*k*), and the bar, O, will be moved a short distance and the rock shafts, N, will be turned so that the rollers, (*i*), at the ends of the arms, (*h*), will strike against and raise the frame, E, and also the saws, so that sand may pass into the saw kerfs underneath the saws.

Any number of saws may be employed so that one or more taper blocks may be sawed at the same time, and saws may be attached to the frame, E, if blocks are required with parallel sides. By having one saw frame placed above the other the saws of one frame may cross those of the other; so that blocks may be sawed to a point or edge, the cut of one set of saws meeting or intersecting the cut of the other set.

Having thus described my invention, what I claim as new and desire to secure by Letters Patent, is,

The rock shafts, N, N, provided with arms, (h), having friction rollers, (i), at their ends; the rock shafts being operated by the bar, O, having pins, (k), (k), upon it, between which the roller, (l), on the pin, (m), works; said pin being attached to the reciprocating frame, F, substantially as shown and described, for the purpose of raising and lowering the saws at each end of their stroke so that sand may be admitted into the saw kerfs.

ISSACHAR A. HEALD.

Witnesses:
E. Wm. W. Bond,
Stephen E. Seymour.